United States Patent [19]
Vainer et al.

[11] 3,944,441
[45] Mar. 16, 1976

[54] METHOD OF MAKING PARTS FROM SHEET METAL BY MEANS OF OXYGEN CUTTING AND AN ARRANGEMENT FOR ORIENTATING THE GAS CUTTING MACHINE TORCH IN WORKING BY SAID METHOD

[76] Inventors: Shimon Abramovich Vainer, ulitsa Logovskaya, 43, kv. 21; Anatoly Fedorovich Temerev, ulitsa Tsimlyanskaya, 34, kv. 46; Savely Abramovich Vainer, ulitsa Krasnopiterskaya, 23, kv. 46; Sergei Sergeevich Nikulin, ulitsa Bakhturova, 1, kv. 26; Matvei Evseevich Kheifets, ulitsa Dotsenko, 37, kv. 11; Vadim Anatolievich Usoltsev, ulitsa Panfilovskaya, 3, kv. 3; Evgeny Fedorovich Matveev, ulitsa Astrovskaya, 13; Georgy Petrovich Kazakov, ulitsa Petrogradskaya, 16, kv. 2; Vladimir Alexandrovich Salkov, ulitsa Krasnopresnenskaya, 31, kv. 33; Anatoly Isidorovich Malinin, ulitsa Dotsenko, 74, kv. 21, all of Volgograd, U.S.S.R.

[22] Filed: Apr. 22, 1974

[21] Appl. No.: 463,063

[52] U.S. Cl. .............................................. 148/9 R
[51] Int. Cl.² .......................................... B23K 7/02
[58] Field of Search .......... 266/23 M, 23 P; 148/9 R

[56] References Cited
UNITED STATES PATENTS
2,139,957  12/1938  Inskeep ................................. 148/9

*Primary Examiner*—W. Stallard

[57] ABSTRACT

In making sheet metal parts by means of oxygen cutting, the cutting torch is positioned so as to direct the oxygen jet at an angle of 4°–5° from the vertical in the direction of the cut and at an equal angle toward the part being cut out.

The arrangement for orientating the gas cutting machine torch during the cutting process comprises two coaxial cylinders. The outer cylinder is mounted rotatably in relation to the inner cylinder. The inner cylinder is fixedly mounted on the carriage of the gas cutting machine and is connected through a flexible means to the cutting torch which is fitted in a bearing whose outer race is linked to the rotatably mounted outer cylinder and is adapted to have an angular motion in a vertical plane. Gas supply hoses pass through the inner cylinder to the cutting torch.

1 Claim, 4 Drawing Figures

METHOD OF MAKING PARTS FROM SHEET METAL BY MEANS OF OXYGEN CUTTING AND AN ARRANGEMENT FOR ORIENTATING THE GAS CUTTING MACHINE TORCH IN WORKING BY SAID METHOD

The present invention relates to the methods of cutting out parts of various shape from sheet metal by means of an oxygen jet and to an arrangement for orientating the torch of a photo-tracing or programme-controlled gas cutting machine employed to work by this method.

It is widely known to cut parts from sheet metal by means of an oxygen jet directed perpendicular to the plane of the metal sheet during the cutting movement of the torch.

With this method, a considerable amount of unburnt metal and its oxides, referred to as dross, becomes deposited on the bottom edges of the cut out parts.

To reduce dross, use is made of very pure (up to 99.9 percent) oxygen which promotes deoxidation of the metal during the cutting process. However, the production of very pure oxygen either results in reduction of the oxygen output or involves large expenses.

It is also known to reduce dross by decreasing the intensity of the metal heating flame, which entails reduction of the cutting rate. In this way the oxygen jet acts on the heated area of the metal for a longer time, bringing about better deoxidation.

Another method known in the art is to position the cutting torch over the metal so that the oxygen jet is inclined 30°–50° from the vertical in the cutting direction and 15°–20° from the vertical toward the part being cut out. During the cutting movement of the torch the latter is kept in such a position as to maintain the oxygen jet at a constant angle to the cutting path irrespective of changes in the direction of cut.

While applying an oxygen jet inclined 30°–50° from the vertical in the cutting direction and 15°–20° toward the part being cut out, the distance between the end of the cutting torch and the surface of the metal must be maintained strictly constant. Any alternation of this distance affects the truth of the dimensions of the part concerned due to dislocation of the point of intersection of the oxygen jet axis and the surface of the metal. Moreover, the application of an oxygen jet inclined at the angles mentioned above appreciably bevels the edges of the parts produced.

There are known gas cutting machines for making parts from sheet metal by means of an oxygen jet.

Such machines comprise a carriage which mounts a cutting torch orientating arrangement, i.e. an arrangement which permits of setting the cutting torch in a position where the oxygen jet is inclined at the required angle to the plane of the metal sheet and enables the torch to be kept in such a position as to maintain the oxygen jet at a constant angle to the cutting path irrespective of changes in the direction of the cut.

The cutting torch orientating arrangements known in the art comprise a bracket to mount the torch, supply lines to deliver oxygen and combustible gas to the torch and a drive mechanism arranged to rotate the bracket with the torch and mounted on the carriage.

The gas supply lines in said arrangements are made in two embodiments, viz: (1) a system of hoses connecting the cutting torch direct to the gas supply; (2) a system of hoses connecting the cutting torch the gas supply through distributing manifolds.

In the first embodiment, the cutting torch can be rotated about its axis through an angle limited to within $3\pi - 4\pi$ because of the hoses becoming twisted due to the rotational movement of the torch.

In the second embodiment, the construction is complicated and not sufficiently reliable since the distributing manifolds involved cannot ensure proper gas tightness.

It is an object of this invention to provide a method of making sheet metal parts by means of oxygen cutting, which method will ensure high quality of the cut out parts in virtue of true dimensions thereof and a small bevel of the edges.

It is a further object of this invention to provide an arrangement for orientating the gas cutting machine torch during the cutting process, which arrangement will enable the cutting torch to rotate without twisting the gas supply hoses and will also preclude gas leakage in the working zone, thereby ensuring high operating reliability.

These objects are achieved in a method of making sheet metal parts by means of oxygen cutting whereby the cutting torch is positioned so as to direct the oxygen jet at an angle to the plane of the metal sheet and during the cutting movement of the torch it is kept orientated so that the angle of the oxygen jet to the cutting path remains constant irrespective of changes in the direction of the cut.

According to the invention, the cutting torch is positioned so that the axis of the oxygen jet is inclined at an angle of 4°–5° from the vertical in the direction of the cut and at an equal angle toward the part being cut out. The arrangement for orientating the cutting machine torch in working by the method described above comprises two coaxial cylinders. The inner cylinder is fixedly mounted on the carriage of the gas cutting machine. The outer cylinder is mounted on said carriage rotatably in relation to the inner cylinder. Said inner cylinder is connected through a flexible means to the cutting torch which is fitted in a bearing. The outer race of this bearing is linked to the rotatably mounted outer cylinder and is adapted to have an angular motion in a vertical plane. The hoses which supply gas to the cutting torch pass through the inner cylinder.

The invention consists essentially in the following.

It is known that the inclination of the oxygen jet from the vertical in the direction of the cut and the consequent inclination of the heating flame make it possible to cut metal at a high rate (up to 900 mm/min, depending on the thickness of the metal involved) by virtue of the inclined flame heating the metal layers ahead of it. Also, with the oxygen jet in this position, dross forming on the bottom edge of the cut is blown out by the jet in the direction of the cutting movement and is thus prevented from depositing in the cut. This materially reduces dross on the edges of cut-out parts. If the oxygen jet is inclined toward the part being cut out, dross is deposited by the jet on the edge of the waste metal, the deposit of dross on the part edges being materially reduced. When the oxygen jet is inclined from the vertical both in the direction of the cut and toward the part being cut out, the edges of the cut-out parts are free from dross.

By considering this method it has been found that the truth of parts dimensions and the amount of the edge bevel produced in gas cutting machines depend on the inclination of the oxygen jet. The larger the angle of inclination, the less accurate are the dimensions of the parts and the larger is the bevel of the edges. The slightest variation in the distance between the torch end and the metal surface due thermal distortion of the metal affects the truth of the dimensions.

We have found the minimum oxygen jet angles which provide for dimensional accuracy and reduction of the edge bevel.

The minimum inclination of the oxygen jet from the vertical in the direction of the cut is 4°–5°. The minimum inclination of the oxygen jet from the vertical toward the part being cut out is also 4°–5°.

When the cutting torch is set so that the oxygen jet is inclined 4°–5° from the vertical in the direction of the cut, the metal is heated sufficiently for the cutting to be done at a high speed. Increasing the angle of inclination does not produce an appreciable improvement of the cutting efficiency.

Inclining the oxygen jet at an angle of 4°–5° toward the part being cut out confines dross to the edge of the waste metal. Increasing this angle does not improve the quality of the edge. Thus, the inclination of the oxygen jet at an angle of 4°–5° from the vertical in the direction of the cut and at the same angle from the vertical toward the part being cut out gives the optimum conditions for high-speed cutting and obviation of dross. These conditions provide for a sufficiently high dimensional accuracy of parts cut out within the practical limits of variation in the distance between the end of the cutting torch and the surface of the metal.

In producing parts of intricate form in a gas cutting machine by means of an oxygen jet inclined to the plane of the metal sheet, the cutting torch has to be orientated by provision of an appropriate arrangement.

The arrangement provided by the present invention keeps the cutting torch orientated so that the angle of the oxygen jet to the cutting path remains constant irrespective of changes in the direction of the cut.

This arrangement has an advantage in that the cutting torch does not rotate about its axis in being orientated, whereby twisting of the gas supply hoses is obviated, making it possible to dispense with gas distributing manifolds.

The cutting torch does not have to rotate about its axis because it is connected through a flexible means to the fixedly mounted inner cylinder and is fitted in a bearing whose outer race is linked to the rotatably mounted outer cylinder.

The cutting torch is adapted to have an angular motion in a vertical plane and can therefore be inclined at the required angles from the vertical.

The gas supply hoses are accommodated inside the fixedly mounted inner cylinder to enable the bearing outer race to be rigidly linked to the rotatably mounted outer cylinder. The element which links the bearing race to the cylinder remains well clear of the gas supply hoses with the outer cylinder rotated through any angle. By directing the cutting torch to the gas supply direct through the hoses gas leakage in the working zone is obviated.

Now the invention will be described in detail with reference to the accompanying drawings in which:

FIG. 1 shows the positional relationship of the cutting torch and the metal sheet during the cutting process.

FIG. 2 diagrammatically shows the cutting process.

For a better understanding the application of the method according to the present invention is considered by way of example.

A part of intricate form is to be cut out from a carbon steel sheet 5 mm thick.

Figure 1:
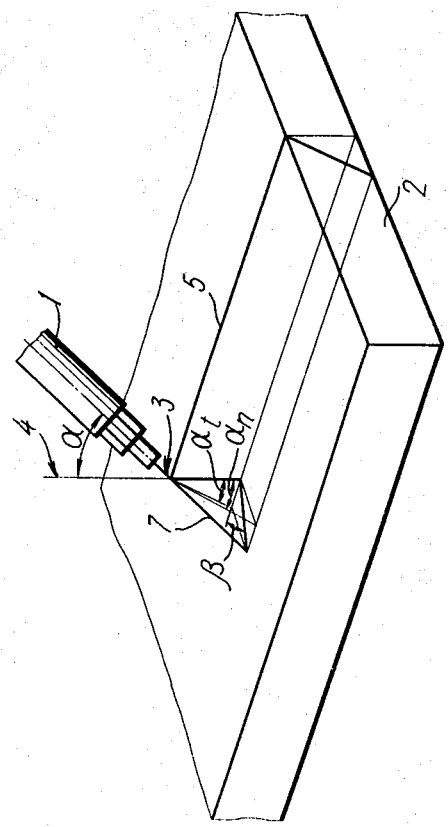
Figure 2:
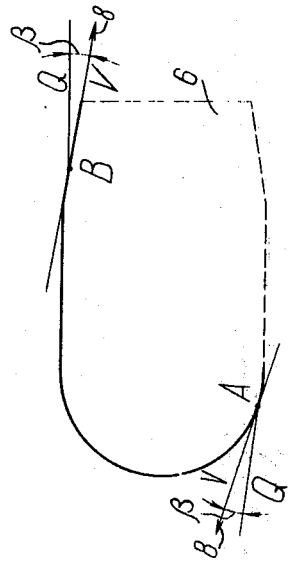

For the purpose a cutting torch 1 (FIG. 1) is positioned over a metal sheet 2 so that the axis 3 of the oxygen jet is inclined at an angle $\alpha_t = 4°–5°$ from a vertical line 4 in the direction of a cutting path 5 and at an angle $\alpha_n = 4°–5°$ toward the part 6 (FIG. 2) being cut out.

After the metal is burnt through at the point A, the cutting torch is moved along the cutting path 5 at a constant speed V. During the cutting process the position of the cutting torch is kept orientated so that the oxygen jet angles $\alpha_t$ and $\alpha_n$ remain constant irrespective of the direction of the cutting path. Under these conditions the projection Q of the oxygen jet portion 7 cutting through the metal and the angle $\beta$ between this projection and the tangent 8 to the cutting path at any given point B remain constant.

The process is continued until the cutting torch returns to the initial point A.

The edges of the part cut out in this manner are bevelled not more than 3°. The dimensions of the part are accurate to within ±1 mm.

Figure 3:
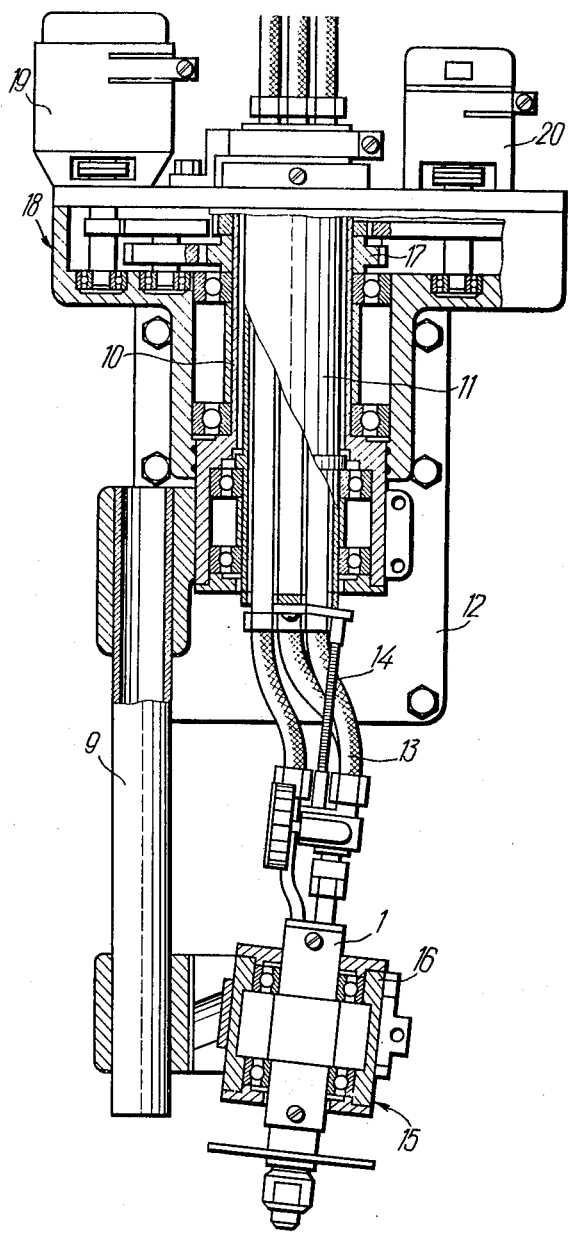
FIG. 3 is a partially cut-away front view of the cutting torch orientating arrangement.

The arrangement shown in FIG. 3 comprises a cutting torch 1 and two coaxial cylinders 10 and 11. The cutting torch 1 is mounted on a bracket 9. The inner cylinder 11 is fixedly mounted on a carriage 12. The outer cylinder 10 is mounted rotatably in relation to the inner cylinder 11. Gas supply hoses 13 pass through the interior of the fixedly mounted cylinder 11 and are connected to the cutting torch 1. A flexible shaft 14 connects the cylinder 11 to the cutting torch 1.

The cutting torch 1 is fitted in a bearing 15. The outer race 16 of the bearing 15 is linked to the rotatably mounted cylinder 10 by a bracket 9. The cylinder 10 has a toothed rim 17 arranged to mesh with a reduction gear 18 which is mounted on the carriage 12.

The reduction gear 18 is connected to a servomotor 19 and a feedback pickup 20.

Figure 4:
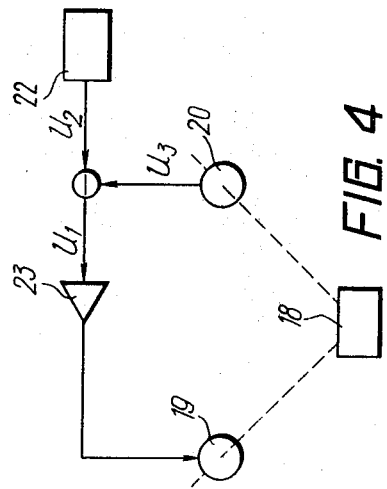
FIG. 4 is a circuit diagram of a system for controlling the cutting torch orientating arrangement.

The output of the pickup 20 is connected to the input of a comparison element 21 (FIG. 4). The other input of the comparison element 21 is connected to a phototracing control system 22. The output of the comparison element 21 is connected to the servomotor 19 through an amplifier 23.

In order that the cutting torch 1 can be set at the angle $\alpha_t$ from the vertical in the direction of the cut the outer race 16 of the bearing 15 is secured to the bracket 9 in a position where the bearing axis makes an angle $\alpha = \alpha_t \sqrt{2}$ with the vertical.

On making the connections of the cutting torch orientating arrangement, the cutting torch is set at the angle $\alpha_n$ toward the part 6.

For the purpose the bracket 9 is turned about the axis of the cylinders 10 and 11 to the required angle and clamped to the outer cylinder by means of any simple clamping device.

When a change in the direction of the cut occurs, the error voltage $U_1$ produced by the element 21 by comparing the voltage $U_2$ supplied by the control system 22 with the voltage $U_3$ supplied by the feedback pickup 20 is fed through the amplifier 23 to the servomotor 19. Thus actuated, the servomotor 19 drives the reduction gear 18 and thereby rotates the outer cylinder 10 and the feedback pickup 20 until there is no more error voltage. In this way the angles $\alpha_t$ and $\alpha_n$ are maintained constant.

As can be seen from the description given herein, the method provided by this invention improves the dimensional accuracy of the cutting process and decreases the bevel of the cut edges, whereas the cutting torch orientating arrangement provided by this invention enables the cutting torch to be rotated without twisting the gas supply hoses, obviating gas leakage in the working zone.

What is claimed is:
1. A method of making parts from sheet metal by means of oxygen cutting by positioning the cutting torch so as to direct the oxygen jet at an angle of 4°–5° from the vertical in the direction of the cut and at an equal angle toward the part being cut out and, during its cutting movement, keeping the torch orientated so that the angle of the oxygen jet to the cutting path remains constant irrespective of changes in the direction of the cut.

* * * * *